United States Patent
Tokita

(10) Patent No.: US 10,521,679 B2
(45) Date of Patent: Dec. 31, 2019

(54) HUMAN DETECTION DEVICE, HUMAN DETECTION SYSTEM, HUMAN DETECTION METHOD, AND HUMAN DETECTION PROGRAM

(71) Applicant: JVC KENWOOD Corporation, Yokohama-shi, Kanagawa (JP)

(72) Inventor: Shigetoshi Tokita, Yokohama (JP)

(73) Assignee: JVCKENWOOD Corporation, Yokohama-Shi, Kanagawa (JP)

(*) Notice: Subject to any disclaimer, the term of this patent is extended or adjusted under 35 U.S.C. 154(b) by 93 days.

(21) Appl. No.: 15/968,572

(22) Filed: May 1, 2018

(65) Prior Publication Data

US 2018/0247140 A1    Aug. 30, 2018

Related U.S. Application Data

(63) Continuation of application No. PCT/JP2017/006539, filed on Feb. 22, 2017.

(30) Foreign Application Priority Data

Jul. 27, 2016    (JP) ................... 2016-146940

(51) Int. Cl.
  *G06K 9/00*    (2006.01)
  *G06K 9/62*    (2006.01)

(52) U.S. Cl.
  CPC ..... *G06K 9/00805* (2013.01); *G06K 9/00369* (2013.01); *G06K 9/6232* (2013.01); *G06K 9/6285* (2013.01)

(58) Field of Classification Search
  CPC .......... G06K 9/00805; G06K 9/00369; G06K 9/6232; G06K 9/6285
  See application file for complete search history.

(56) References Cited

U.S. PATENT DOCUMENTS

| 2005/0063565 A1* | 3/2005 | Nagaoka | B60R 21/013 |
| | | | 382/104 |
| 2006/0126896 A1* | 6/2006 | Nagaoka | G01S 17/89 |
| | | | 382/103 |

(Continued)

FOREIGN PATENT DOCUMENTS

| EP | 1897751 A2 | 3/2008 |
| EP | 2381415 A1 | 10/2011 |

(Continued)

OTHER PUBLICATIONS

Li, X. et al., "A Unified Framework for Concurrent Pedestrian and Cyclist Detection" IEEE Transactions on Intelligent Transportation Systems, Feb. 2017; 14 pages; vol. 18, No. 2.

*Primary Examiner* — David F Dunphy
(74) *Attorney, Agent, or Firm* — Procopio, Cory, Hargreaves & Savitch LLP

(57) ABSTRACT

A human detection device comprises an image acquiring unit configured to acquire an image captured by an imaging device, a human detecting unit configured to detect a human from the acquired image, a ground contact position identifying unit configured to identify a ground contact position of the human on the basis of a lower end portion of the detected human, a feature portion extracting unit configured to extract a feature portion of the detected human, a ratio calculating unit configured to calculate a ratio of the feature portion on the basis of a vertical size of the detected human and a vertical size of the extracted feature portion and a correction determining unit configured to determine whether the identified ground contact position is to be corrected on the basis of the identified ground contact position or the calculated ratio.

9 Claims, 8 Drawing Sheets

(56) References Cited

U.S. PATENT DOCUMENTS

| | | | | |
|---|---|---|---|---|
| 2010/0021010 A1* | 1/2010 | Zhang | ............... | G06K 9/00369 |
| | | | | 382/104 |
| 2013/0259307 A1* | 10/2013 | Torii | ............... | G06K 9/00624 |
| | | | | 382/103 |
| 2014/0205139 A1* | 7/2014 | Kriel | ............... | G06K 9/00805 |
| | | | | 382/103 |
| 2014/0211994 A1* | 7/2014 | Takenaka | ........... | G06K 9/00362 |
| | | | | 382/103 |
| 2014/0270378 A1* | 9/2014 | Aimura | ............ | G06K 9/00805 |
| | | | | 382/103 |
| 2015/0049908 A1* | 2/2015 | Ogawa | .................. | G08G 1/166 |
| | | | | 382/103 |
| 2016/0335490 A1* | 11/2016 | Wang | ............... | G06K 9/00778 |
| 2017/0076148 A1* | 3/2017 | Sashida | ............. | G06K 9/00369 |
| 2019/0162439 A1* | 5/2019 | Tsuda | ........................ | G06T 7/00 |

FOREIGN PATENT DOCUMENTS

| | | |
|---|---|---|
| EP | 2506211 A1 | 10/2012 |
| JP | 2008065756 A | 3/2008 |
| WO | 2015104898 A1 | 7/2015 |

\* cited by examiner

HUMAN DETECTION DEVICE, HUMAN DETECTION SYSTEM, HUMAN DETECTION METHOD, AND HUMAN DETECTION PROGRAM

CROSS REFERENCE TO RELATED APPLICATION

The present application is based upon and claims the benefit of priority from Japanese Patent Application No. 2016-146940, filed on Jul. 27, 2016, and International application No. PCT/JP2017/006539 filed on Feb. 22, 2017, the entire contents of which are hereby incorporated by reference.

BACKGROUND

The present disclosure relates to a human detection device, a human detection system, a human detection method, and a human detection program.

Techniques for detecting humans (pedestrians, bicyclists, etc.) around vehicles through recognition of images captured by onboard cameras are being developed. For example, Japanese Unexamined Patent Application Publication No. 2008-065756 describes a drive assistance device in which a road region and a pedestrian candidate are detected from an image captured of the surroundings of a vehicle and the detected pedestrian candidate is determined to be a pedestrian if a lower portion of the pedestrian candidate is in contact with the road region.

SUMMARY

In the drive assistance device described in Japanese Unexamined Patent Application Publication No. 2008-065756, when a covering object that covers a portion of the pedestrian candidate is present on a closer side of the pedestrian candidate and the covering object is in contact with the road region, the drive assistance device may determine the pedestrian candidate and the covering object all together to be a pedestrian. In that case, the ground contact position of the pedestrian cannot be accurately identified, and the distance from the vehicle to the pedestrian is miscalculated.

An embodiment provides a human detection device, comprising: an image acquiring unit configured to acquire an image captured by an imaging device; a human detecting unit configured to detect a human from the acquired image; a ground contact position identifying unit configured to identify a ground contact position of the human on the basis of a lower end portion of the detected human; a feature portion extracting unit configured to extract a feature portion of the detected human; a ratio calculating unit configured to calculate a ratio of the feature portion on the basis of a vertical size of the detected human and a vertical size of the extracted feature portion; and a correction determining unit configured to determine whether the identified ground contact position is to be corrected on the basis of the identified ground contact position or the calculated ratio, in which the ground contact position identifying unit corrects the identified ground contact position on the basis of the vertical size and the ratio of the feature portion.

Further, the embodiment provides a human detection method, comprising: acquiring an image captured by an imaging device; detecting a human from the acquired image; identifying a ground contact position of the human on the basis of a lower end portion of the detected human; extracting a feature portion of the detected human; calculating a ratio of the feature portion on the basis of a vertical size of the detected human and a vertical size of the extracted feature portion; determining whether the identified ground contact position is to be corrected on the basis of the identified ground contact position or the calculated ratio; and correcting the identified ground contact position on the basis of the vertical size and the ratio of the feature portion.

DETAILED DESCRIPTION

Hereinafter, a human detection system and a human detection method according to an exemplary embodiment will be described with reference to the drawings.

First, a configuration of the human detection system according to the present exemplary embodiment will be described.

Figure 1:
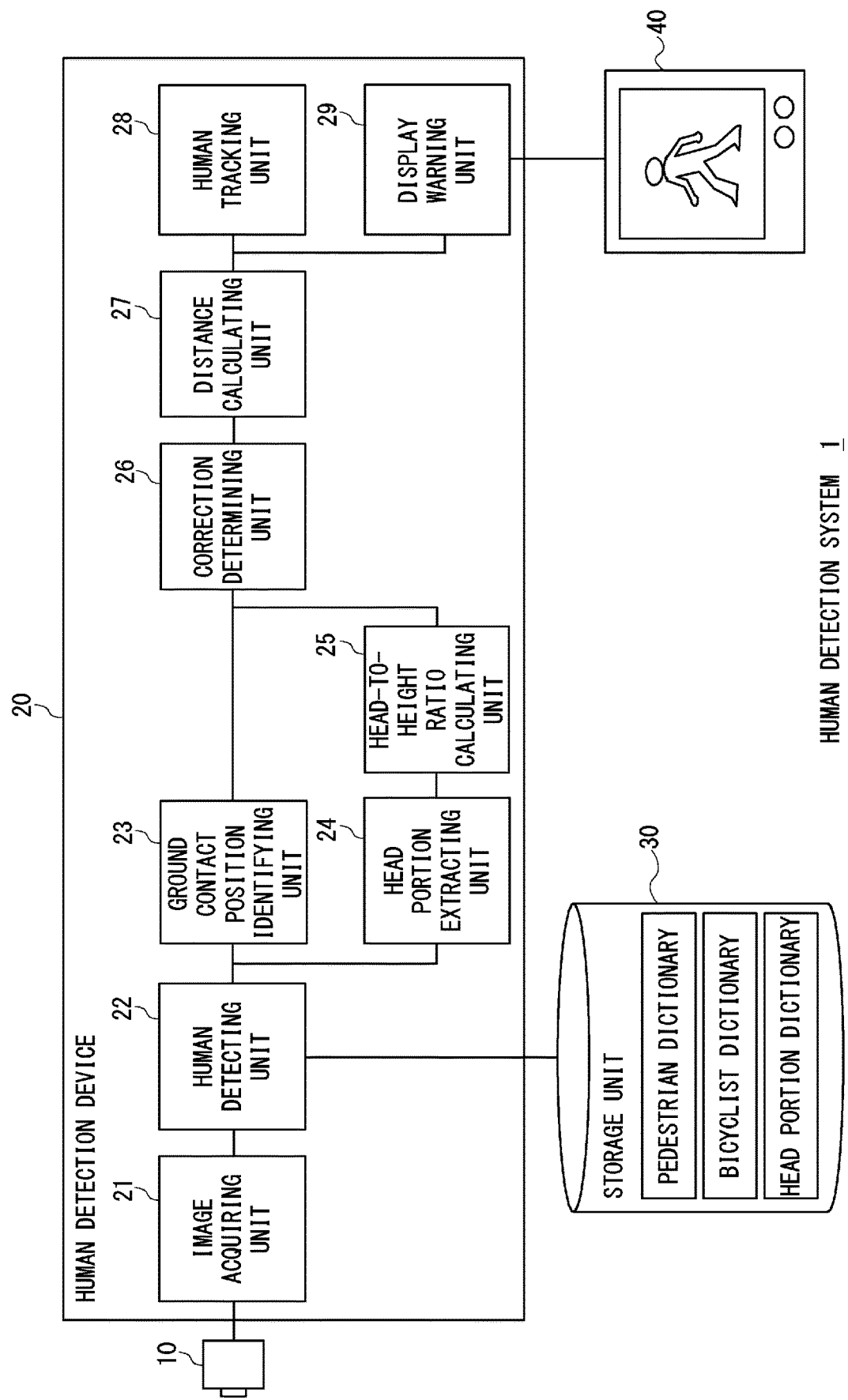
FIG. 1 is a block diagram illustrating a schematic configuration of a human detection system 1 according to an exemplary embodiment.

FIG. 1 is a block diagram illustrating a schematic configuration of a human detection system 1 according to the present exemplary embodiment.

The human detection system 1 is a system mounted primarily in a vehicle and includes a front-view camera 10, a human detection device 20, a storage device 30, and a display device 40.

The front-view camera 10 is a monocular camera installed in a vehicle to be capable of capturing an image of a space in front of the vehicle. The front-view camera 10 successively captures visible images of the space in front of the vehicle and outputs the captured images to the human detection device 20.

The human detection device 20 detects a human such as a pedestrian or a bicyclist by using the images captured by the front-view camera 10 and various dictionaries for detecting humans stored in the storage device 30 and outputs a warning signal, as necessary, to the display device 40. To this end, the human detection device 20 includes, an image acquiring unit 21, a human detecting unit 22, a ground contact position identifying unit 23, a head portion extracting unit 24, a head-to-height ratio calculating unit 25, a correction determining unit 26, a distance calculating unit 27, a human tracking unit 28, and a display warning unit 29.

The image acquiring unit 21 receives an input of an image captured by the front-view camera 10, subjects the image to various types of image processing, and outputs the image to the human detecting unit 22.

The human detecting unit 22 detects a human from the image by using the dictionaries for detecting humans, such as a pedestrian dictionary and a bicyclist dictionary, stored in the storage device 30 and outputs the detection result to the ground contact position identifying unit 23 and the head portion extracting unit 24. The human detecting unit 22 detects a human, for example, in each frame or in a set of several frames of the image captured by the front-view camera 10.

The ground contact position identifying unit 23 identifies a lower end portion of the human detected by the human detecting unit 22 as the ground contact position of that human and outputs the identification result to the correction determining unit 26.

In addition, when the correction determining unit 26 determines that the identification result of the ground contact position is to be corrected, the ground contact position identifying unit 23 changes the lower end portion of the human detected by the human detecting unit 22 and corrects the ground contact position on the basis of the position and the vertical size of the human's head portion extracted by the head portion extracting unit 24, the value of the head-to-height ratio calculated by the head-to-height ratio calculating unit 25, and so on.

The head portion extracting unit (feature portion extracting unit) 24 extracts the human's head portion from an image region of the human detected by the human detecting unit 22 by using a head portion dictionary stored in the storage device 30 and outputs the extraction result to the head-to-height ratio calculating unit 25.

The head-to-height ratio calculating unit (ratio calculating unit) 25 calculates the head-to-height ratio from the vertical size of the human detected by the human detecting unit 22 and the vertical size of the human's head portion extracted by the head portion extracting unit 24 and outputs the calculation result to the correction determining unit 26.

The correction determining unit 26 determines whether or not to correct the ground contact position identified by the ground contact position identifying unit 23 on the basis of the ground contact position identified by the ground contact position identifying unit 23 or the head-to-height ratio calculated by the head-to-height ratio calculating unit 25 and outputs the determination result to the ground contact position identifying unit 23 or the distance calculating unit 27.

The distance calculating unit 27 calculates the distance between the ground contact position identified or corrected by the ground contact position identifying unit 23 and the host vehicle (or the front-view camera 10) and outputs the calculation result to the human tracking unit 28 and the display warning unit 29.

The human tracking unit 28 assigns a unique ID to and tracks each human detected by the human detecting unit 22 and outputs, to the correction determining unit 26, positional information such as the ground contact position and the head portion position, head-to-height ratio information, and so on of each human.

The display warning unit 29 outputs, to the display device 40, various pieces of information such as the image acquired by the image acquiring unit 21 and a detection rectangle for the human detected by the human detecting unit 22. In addition, the display warning unit 29 outputs a warning signal to the display device 40 when the distance between the host vehicle and the detected human falls below a predetermined value.

The storage device 30 stores the dictionaries for detecting humans, such as the pedestrian dictionary, the bicyclist dictionary, and the head portion dictionary, to be used by the human detecting unit 22 for detecting a pedestrian, a bicyclist, head portions thereof, and so on. These dictionaries for detecting humans are generated through machine learning of feature amounts of positive images and negative images. Positive images are images of a pedestrian, a bicyclist, a human's head portion, or the like captured at various angles or images cut out from such images, and negative images are images in which no pedestrian or the like is captured. For example, an image that captures from the top of the head to the toes (or the heels) of a pedestrian serves as a positive image when the pedestrian dictionary is generated, and an image that captures the entirety (or a portion) of a bicycle including from the top of the head of a bicyclist to a ground contact portion of a wheel serves as a positive image when the bicyclist dictionary is generated. In addition, an image that captures the head portion of a human serves as a positive image when the head portion dictionary is generated.

The display device 40 outputs an image, a sound, and so on in accordance with various signals output by the display warning unit 29. The display device 40 can be constituted by a car navigation monitor, a head-up display (HUD), or the like.

Note that the respective components implemented by the human detection device 20 can be implemented by executing programs under the control of a calculation apparatus (not shown) included in the human detection device 20, which is, for example, a computer. More specifically, the human detection device 20 loads programs stored in a storage unit (not shown) to a main storage apparatus (not shown) and implements the respective components by executing the programs under the control of the calculation apparatus.

Further, the respective components may not only be implemented by software including programs but also implemented by a combination of hardware, firmware, and software and the like.

The above-mentioned programs can be stored and provided to the human detection device 20 using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (erasable PROM), flash ROM, RAM (random access memory), etc.).

The program may be provided to the human detection device 20 using any type of transitory computer readable media. Examples of transitory computer readable media include electric signals, optical signals, and electromagnetic waves. Transitory computer readable media can provide the program to the human detection device 20 via a wired communication line (e.g. electric wires, and optical fibers) or a wireless communication line.

Next, an operation of the human detection system 1 according to the present exemplary embodiment, namely, a human detection method will be described in concrete terms.

Figure 2:
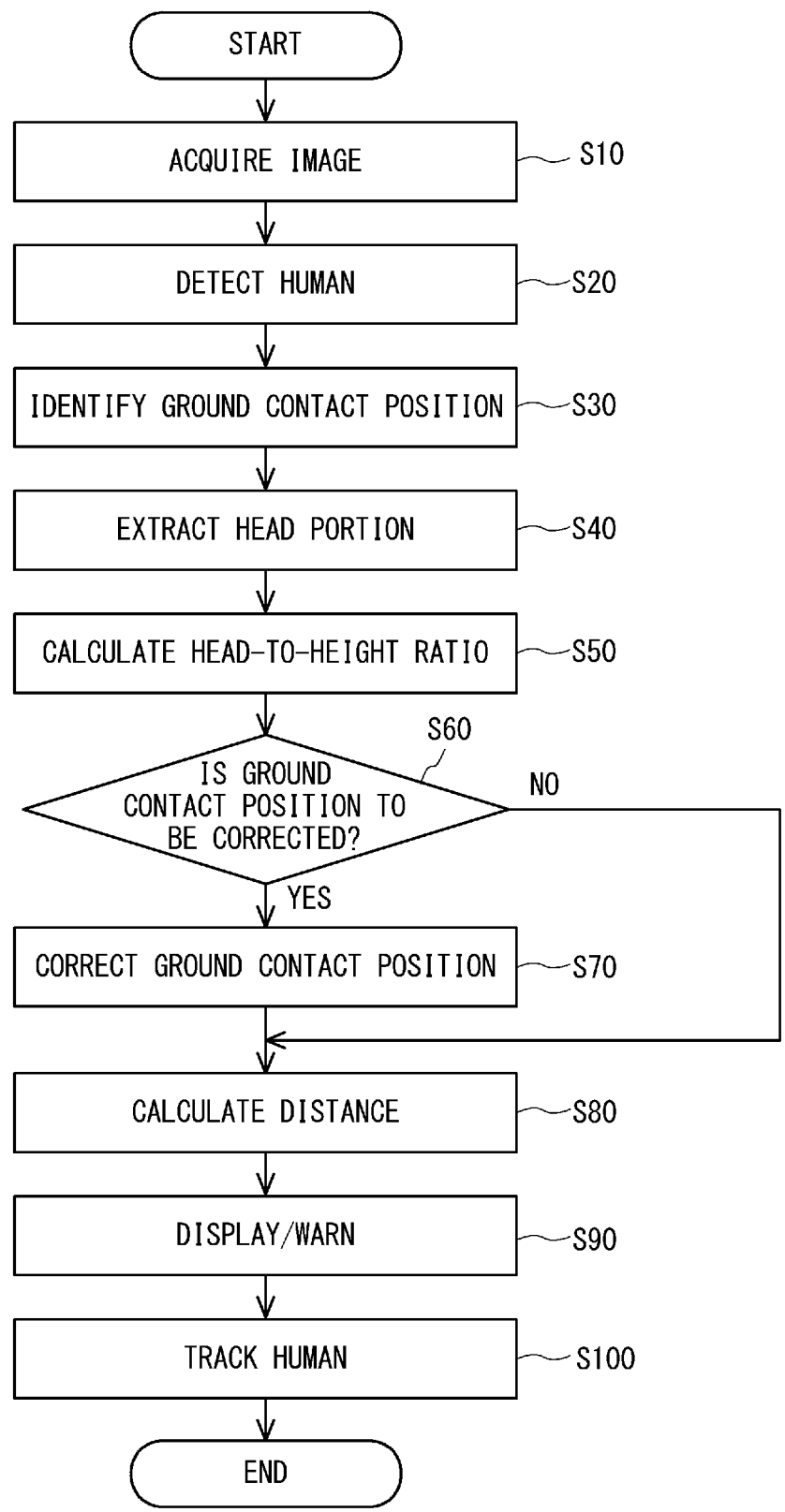
FIG. 2 is a flowchart illustrating processing procedures of the human detection method according to the exemplary embodiment.

FIG. 2 is a flowchart illustrating processing procedures of the human detection method according to the present exemplary embodiment.

Upon the human detection system 1 starting to operate, the front-view camera 10 captures an image of a space in the traveling direction of the vehicle, and the image acquiring unit 21 acquires the image as a detection target image (step S10).

Then, the human detecting unit 22 detects a human from the detection target image by using the pedestrian dictionary, the bicyclist dictionary, and so on stored in the storage device 30 (step S20).

Figure 3:
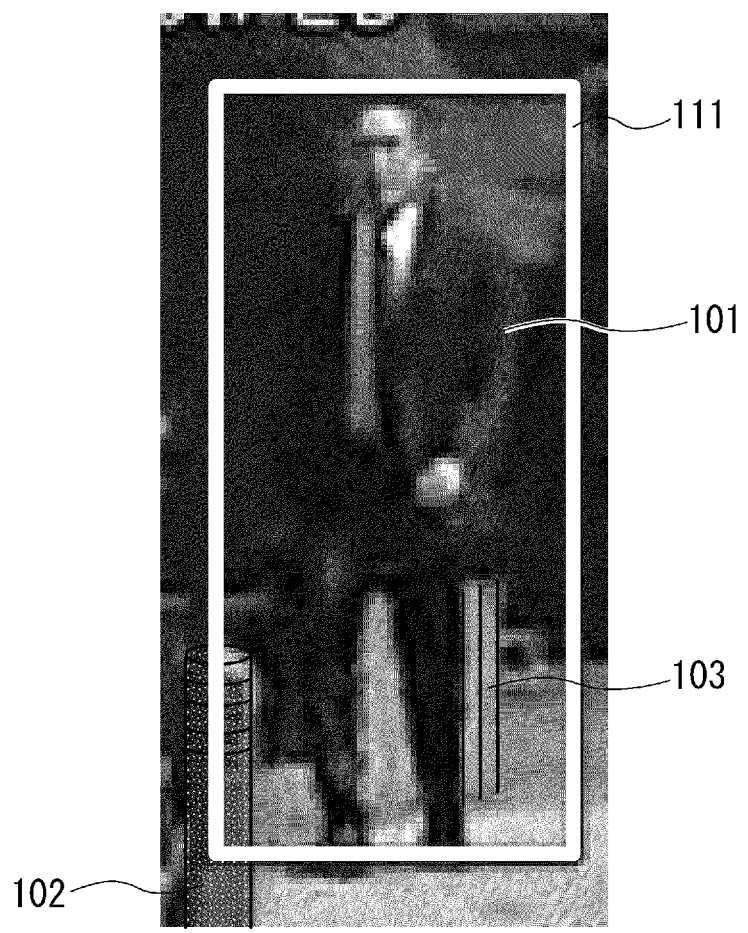
FIG. 3 is an illustration for illustrating the detection target image and the human detection result according to the exemplary embodiment.

FIG. 3 illustrates the detection target image and the human detection result according to the present exemplary embodiment.

A pedestrian 101 is captured in the middle of the image in the detection target image, a stopper pole 102 is captured in the lower left of the image, and a low-profile fence 103 is captured behind the pedestrian in the lower half of the image. There is nothing covering the pedestrian 101 from the front-view camera 10 (no covering object). Therefore, a detection rectangle 111 indicating the result of the human detecting unit 22 detecting the pedestrian 101 encloses the pedestrian 101 to include from the top of the head to the lower end portions of the legs of the pedestrian 101, which indicates that the pedestrian 101 is being detected correctly.

A human is detected by calculating the degree of similarity between the dictionaries for detecting humans and a detection target image with the use of, for example, the Haar-like feature amount, the HOG (Histogram of Gradients) feature amount, the LBP (Local Binary Patterns) feature amount, or the like.

Next, the ground contact position identifying unit 23 identifies the ground contact position of the detected human (step S30). The ground contact position identifying unit 23 identifies, for example, the lower end portion (the lower side) of the detection rectangle 111 illustrated in FIG. 3 as the ground contact position.

In addition, the head portion extracting unit 24 extracts the head portion of the detected human from the detection target image (step S40). The head portion extracting unit 24 extracts the human's head portion, for example, in the upper side within the region in the detection rectangle 111 illustrated in FIG. 3 by using the head portion dictionary.

Then, the head-to-height ratio calculating unit 25 calculates the head-to-height ratio of the detected human (step S50).

Figure 4:
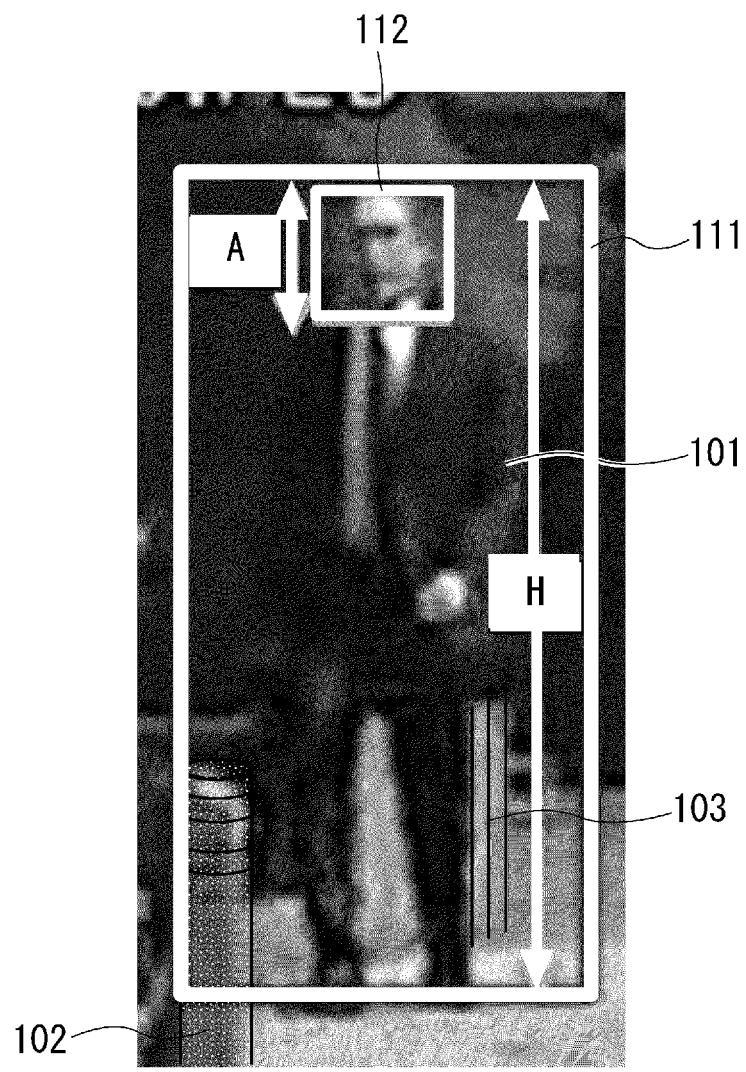
FIG. 4 is an illustration for describing head-to-height ratio calculation processing according to the exemplary embodiment.

FIG. 4 is an illustration for describing head-to-height ratio calculation processing according to the present exemplary embodiment. FIG. 4 illustrates the detection rectangle 111 for the pedestrian 101 and a detection rectangle 112 for the head portion in the detection target image illustrated in FIG. 3.

The head-to-height ratio calculating unit 25 calculates the head-to-height ratio (H/A) from the vertical size (e.g., the length of the detection rectangle 111 in the vertical direction) H of the pedestrian 101 in the image and the vertical size (e.g., the length of the detection rectangle 112 in the vertical direction) A of the head portion of the pedestrian 101 in the image.

It is to be noted that step S30 and steps S40 and S50 may be processed in parallel, or one of step S30 and steps S40 and S50 may be processed first.

Next, the correction determining unit 26 determines whether or not to correct the ground contact position identified in step S30, that is, determines whether a correction is to be made (step S60).

The correction determining unit 26 determines that the ground contact position in the image is to be corrected, for example, if the head-to-height ratio calculated in step S50 indicates an abnormal value (e.g., if the head-to-height ratio is no higher than 3 or no lower than 10) (YES in step S60).

In this case, the ground contact position identifying unit 23 changes the detection rectangle set in step S20 to correct the ground contact position identified in step S30 by using the position and the size of the head portion extracted in step S40 and the value of an average head-to-height ratio (the head-to-height ratio of 7 to 8) so that the value of the head-to-height ratio of the human detected in step S20 results in the value of the average head-to-height ratio (step S70). The ground contact position identifying unit 23 may only correct the ground contact position (or information concerning with the ground contact position) without changing the detection rectangle.

In a case in which an irregular variation (change) occurs to the identified ground contact position or to the calculated head-to-height ratio, the correction determining unit 26 also determines that the ground contact position is to be corrected in the image with the irregular variation, and examples of such a case include when the ground contact position of the human whom the human tracking unit 28 has assigned ID to and been tracking largely goes off the position estimated on the basis of the ground contact positions in the previous frames and when the head-to-height ratio of the human whom the human tracking unit 28 has been tracking largely differs from the values calculated in the previous frames. For example, when the value of the head-to-height ratio of the human whom the human tracking unit 28 has been tracking is shifting around 7 in the previous frames but a calculation of the head-to-height ratio in a given frame results in 10, the correction determining unit 26 determines that the ground contact position identified in this given frame is to be corrected.

In this case as well, the ground contact position identifying unit 23 changes the detection rectangle to correct the ground contact position so that the value of the head-to-height ratio of the detected human results in a value substantially equal to the values calculated in the previous frames on the basis of the position and the size of the head portion extracted in step S40 and the values of the head-to-height ratio calculated in the previous frames. In addition, the ground contact position identifying unit 23 may correct the identified ground contact position to the position estimated from the ground contact positions in the previous frames.

Figure 5:
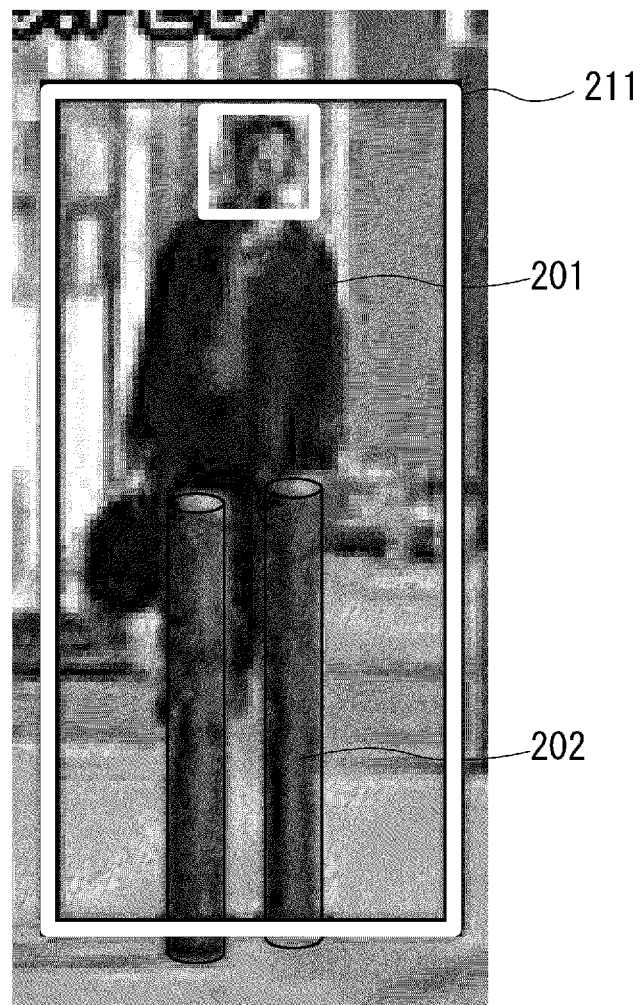
FIG. 5 is an illustration for describing an incorrect identification of the ground contact position according to the exemplary embodiment.

FIG. 5 is an illustration for describing an incorrect identification of the ground contact position according to the present exemplary embodiment.

A pedestrian 201 is captured in the middle of the image in the detection target image, and a stopper pole (covering object) 202 is captured to cover a leg portion of the pedestrian 201 in the middle in the lower half of the image. The feature of the leg of the pedestrian is similar to the feature of the stopper pole 202. Thus, a detection rectangle 211 indicating the result of detecting the pedestrian 201 by the human detecting unit 22 broadly encloses the pedestrian 201 and the stopper pole 202 to include from the top of the head of the pedestrian 201 to the lower end portion of the stopper pole 202, which indicates that the pedestrian 201 is not being detected correctly and the lower end portion of the stopper pole 202 is being identified incorrectly as the ground contact position of the pedestrian 201. The value of the head-toheight ratio calculated by the head-to-height ratio calculating unit 25 also varies largely from the values calculated in the previous frames.

In this case, as described above, the ground contact position identifying unit 23 may change the detection rectangle to correct the ground contact position on the basis of the vertical size of the extracted head portion and the values of the head-to-height ratio calculated in the previous frames, and the ground contact position correction processing described above (step S40 to step S70) works effectively.

When the correction determining unit 26 determines whether or not to correct the ground contact position, the human may be detected anew with the use of a dictionary of upper halves of human bodies or the like stored in the storage device 30, and it may be determined whether an irregular variation in the ground contact position or in the head-to-height ratio has been caused by the lower half of the human's body being covered.

The correction determining unit 26 may determine that the ground contact position in a given frame is to be corrected if a human has been detected in step S20 but the human's head portion cannot be extracted in step S40.

In this case, the ground contact position identifying unit 23 estimates the size and the position of the head portion in the current frame from the sizes and the positions of the head portion in the previous frames and changes the detection rectangle for the human in the current frame to correct the identified ground contact position by using the information on the head-to-height ratio.

The correction determining unit 26 may determine that the identified ground contact position is not to be corrected when the position of the head portion (e.g., the center of the head portion) of the human whom the human tracking unit 28 has been tracking largely goes off the position estimated on the basis of the positions of the head portion in the previous frames, that is, when an irregular variation is observed in the position of the extracted head portion among a plurality of images. Alternatively, the correction determining unit 26 may determine that the identified ground contact position is to be corrected when no irregular variation is observed in the position of the extracted head portion.

For example, when a large change is observed in the position of the head portion of the human being tracked, it is likely that the human has bent over or squatted down. Even if the value of the head-to-height ratio calculated in such a case differs from a normal value, the calculated value itself is not an error, nor is the identified ground contact position. Therefore, the identified ground contact position need not be corrected.

Figure 6:
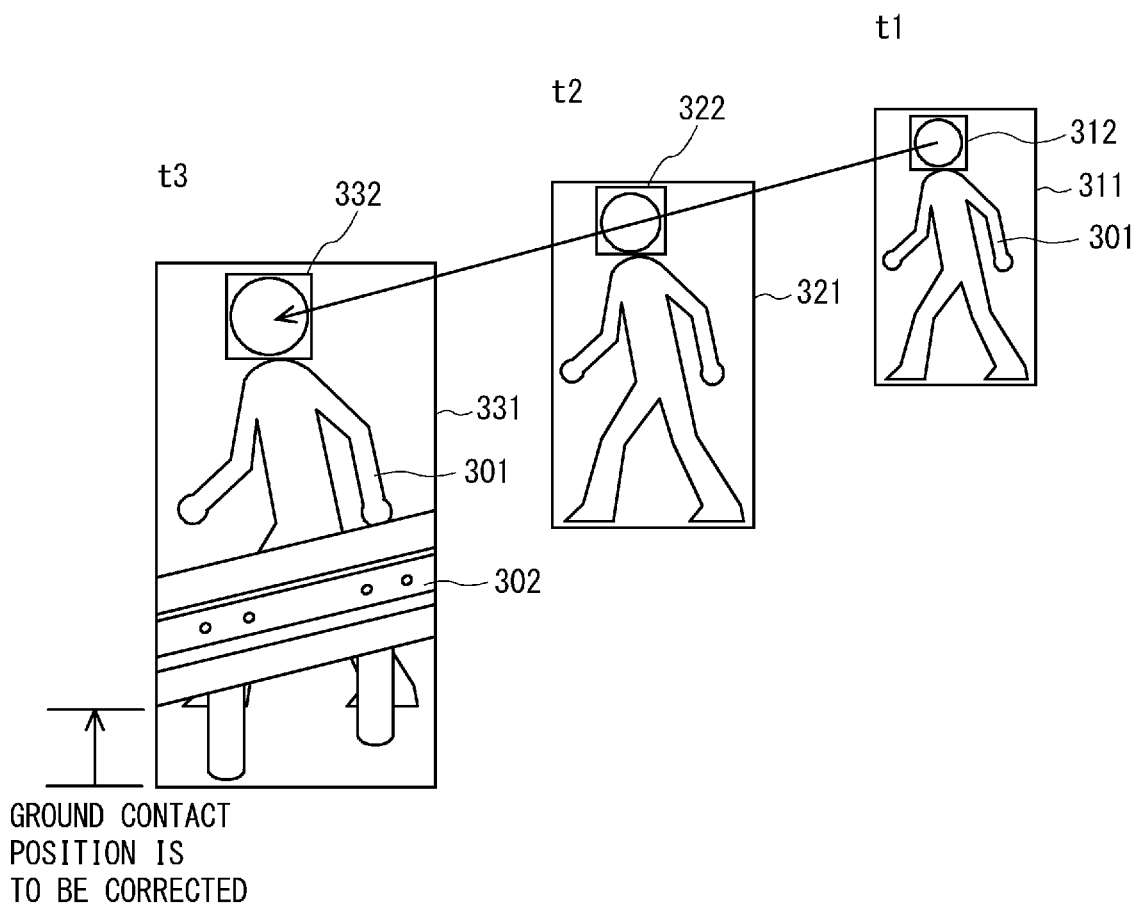
FIG. 6 is an illustration for describing the determination of correcting the ground contact position according to the exemplary embodiment.
Figure 7:
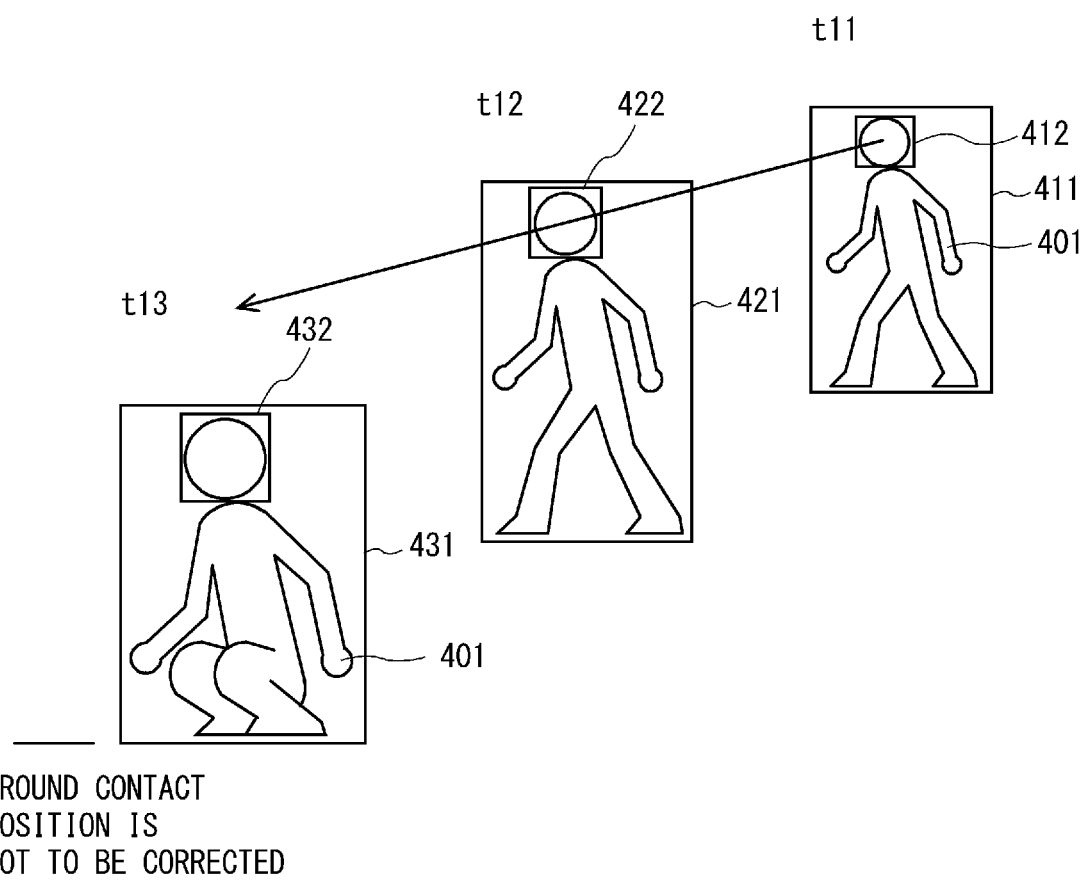
FIG. 7 is an illustration for describing the determination of correcting the ground contact position according to the exemplary embodiment.

FIG. 6 and FIG. 7 are illustrations for describing the determination of correcting the ground contact position according to the present exemplary embodiment. FIG. 6 and FIG. 7 illustrate the detection results (extraction results) of a human and his/her head portion at each time t in scenes in which a pedestrian 301 and a pedestrian 401, respectively, move from the position in the back right to the position in the front left.

In the scene illustrated in FIG. 6, with regard to the pedestrian 301, detection rectangles 311 and 312 for the human and the head portion, respectively, are indicated at a time t1, and detection rectangles 321 and 322 are indicated in a similar manner at a time t2, indicating that there is no problem in the positions and the sizes of the detection rectangles and in the calculated head-to-height ratio. Thus, the correction determining unit 26 determines that the human and the head portion are being detected or extracted correctly at the times t1 and t2 and that the ground contact position is not to be corrected.

However, a guardrail 302 is on a closer side of the pedestrian 301 at a time t3, and the human detecting unit 22 has incorrectly detected the pedestrian 301 and the poles of the guardrail 302 as the pedestrian 301. Therefore, a detection rectangle 331 is being extended vertically, and the calculated head-to-height ratio is being increased, as compared to those at the times t1 and t2. In such a case, the correction determining unit 26 determines that the ground contact position is to be corrected since an irregular variation is observed in the value of the head-to-height ratio but the position of the head portion at the time t3 is at the position estimated from the positions of the head portion at the times t1 and t2 and changes the detection rectangle 331 at the time t3.

In the scene illustrated in FIG. 7 as well, the pedestrian 401 and his/her head portion are being detected or extracted correctly at times t11 and t12, and the correction determining unit 26 determines that the ground contact position is not to be corrected.

However, the pedestrian 401 has squatted down at a time t13, and thus a detection rectangle 431 is being shortened vertically, and the calculated head-to-height ratio is being reduced, as compared to those at the times t11 and t12. In such a case, the correction determining unit 26 determines that the detection rectangle 431 is not to be changed at the time t13 and that the ground contact position is not to be corrected either since, even though an irregular variation is observed in the value of the head-to-height ratio, the position of the head portion at the time t13 is not at the position estimated from the positions of the head portion at the times t11 and t12.

When the ground contact position of a pedestrian moves up and down repeatedly in a short period of time or when the head-to-height ratio of a pedestrian varies to increase and decrease repeatedly in a short period of time, the correction determining unit 26 may determine that this human is not a pedestrian but a bicyclist and may cause the human detecting unit 22 to detect the human again by using the bicyclist dictionary.

For example, when an image of a bicyclist is captured from the behind, the bicycle may fail to be detected, and the bicyclist may be detected incorrectly as a pedestrian. Even in such a case, when a repeated change in the ground contact position or the head-to-height ratio in a short period of time is confirmed, this human can be detected anew as a bicyclist, and the ground contact position of a wheel of the bicycle can be identified as the correct ground contact position.

Figure 8:
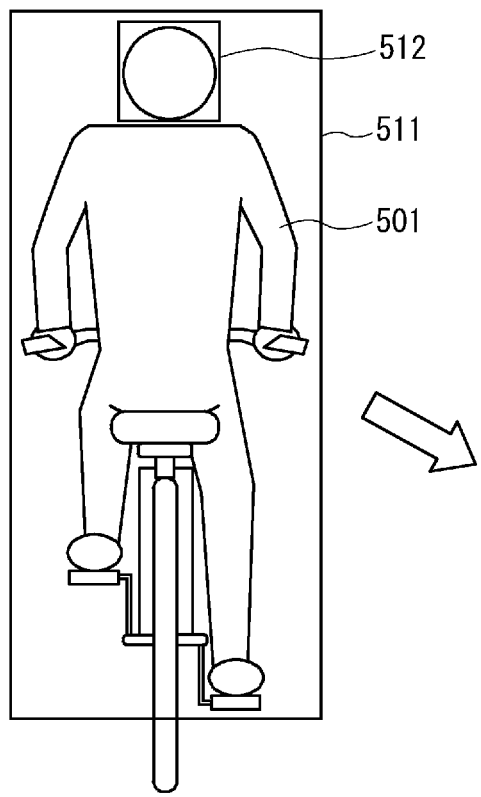
FIG. 8 is another illustration for describing the determination of correcting the ground contact position according to the exemplary embodiment.
Figure 8:
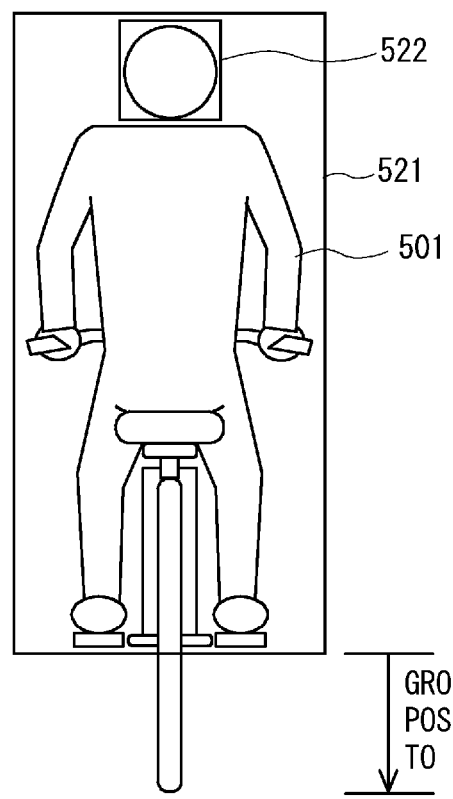

FIG. 8 is another illustration for describing the determination of correcting the ground contact position according to the present exemplary embodiment. FIG. 8 illustrates the detection (extraction) result of a human and his/her head portion when an image of a person (bicyclist) 501 riding a bicycle is captured from the behind.

At a time t21, the right leg of the bicyclist 501 stepping on the pedal is stretched, and a detection rectangle 511 is being extended vertically. At a time t22, the right and left feet of the bicyclist 501 are at the same height, and a detection rectangle 521 is shortened vertically. Then, the detection rectangle extends and shrinks repeatedly in a short period of time, and the ground contact position corresponding to the lower end of the detection rectangle also goes up and down repeatedly in a short period of time. In such a case, the correction determining unit 26, determining that the detected human 501 is not a pedestrian but a bicyclist, causes the human detecting unit 22 to detect the human anew by using the bicyclist dictionary and corrects the ground contact position to the ground contact position of the wheel.

When the correction determining unit 26 determines that the identified ground contact position is not to be corrected (NO in step S60), the processing proceeds to step S80.

Next, the distance calculating unit 27 calculates the distance between the detected human and the host vehicle on the basis of the identified or corrected ground contact position (step S80). The distance calculating unit 27 can calculate the distance between the detected human and the host vehicle by using a table created on the basis of the height, the angle, and so on when the front-view camera 10 is installed in the vehicle and indicating a correspondence relationship between the position (y-coordinate) in the captured image and the distance from the host vehicle.

Next, the display warning unit 29 causes the display device 40 to display the detection target image acquired in step S10, the detection rectangle for the human detected in step S20, the detection rectangle for the head portion extracted in step S40, the distance from the host vehicle to the human calculated in step S80, and so on. In place of the detection rectangles or in addition to the detection rectangles, the display warning unit 29 may cause the display device 40 to display the ground contact position.

In addition, the display warning unit 29 causes the display device 40 to output an image and a sound that warns the driver that the human is in close proximity when the distance to the human is smaller than a predetermined value and there is a chance of collision with the human (step S90).

Next, the human tracking unit 28 assigns an ID to and tracks each of the detected humans by using the position, the feature amount, and so on of the detected human in each frame (step S100). A particle filter method, a mean shift method, or the like is used for tracking.

In addition, the human tracking unit 28 outputs tracking information including history information of the identified ground contact positions (coordinates), the calculated values of the head-to-height ratio, and so on to the correction determining unit 26, the ground contact position identifying unit 23, and so on. These pieces of information are used when the correction determining unit 26 makes a determination as to correcting the ground contact position or when the ground contact position identifying unit 23 corrects the ground contact position.

Step S90 and step S100 may be processed in parallel, or one of step S90 and step S100 may be processed first.

In the human detection system 1 or the human detection method according to the present exemplary embodiment, the head portion is extracted from the detected human, and the head-to-height ratio is calculated and used to correct the ground contact position. Alternatively, a characteristic region (feature portion) that can be extracted stably from an image of a detected human and that has a constant shape, a vivid color, or the like may be extracted, and the ratio between the vertical size of the detected human and the vertical size of the feature portion may be calculated to correct the ground contact position. As such a feature portion, for example, an arm, a leg, an outer garment, an umbrella, a bag, or the like may be extracted.

In addition, a feature amount that allows its ratio to the vertical size of a detected human to be calculated and that indicates a characteristic size may be calculated directly from the image and used to correct the ground contact position. As a feature amount in such a case, the body width, the shoulder width, or the like of the detected human can be used.

In the human detection system 1 or the human detection method according to the present exemplary embodiment, a far-infrared camera can be used as the front-view camera 10. A far-infrared camera detects the heat emitted by an object and converts the temperature differences into the luminance differences to form an image. When a far-infrared image is used as a detection target image, a feature that a human region with a higher temperature has a higher luminance value and a peripheral region with a temperature lower than that of the human has a lower luminance value is used.

For example, in a far-infrared image that has captured the scene illustrated in FIG. 5, a peripheral region including the stopper pole has a lower luminance, the lower end of the detection rectangle for the human is vertically shortened to where the human is not covered by the stopper pole, and the head-to-height ratio is calculated to 3 to 4. Even in such a case, with the ground contact position correction processing according to the present exemplary embodiment, the detection rectangle can be changed to correct the ground contact position on the basis of the position and the size of the extracted head portion. A visible image and a far-infrared image may be switched therebetween in accordance with the imaging condition or the human detecting condition.

In the human detection system 1 or the human detection method according to the present exemplary embodiment, the pedestrian dictionary, the bicyclist dictionary, and so on created through machine learning of images that capture pedestrians, bicyclists, and so on are used to detect a human. Alternatively, a human may be detected through pattern matching or the like in which a template image of a pedestrian, a bicyclist, or the like is used.

The descriptions have assumed that the human detection system 1 according to the present exemplary embodiment is mounted in a vehicle, and the human detection system 1 may be fixed in a vehicle or may be installed in a vehicle in a portable manner. The human detection system 1 may be configured to be wearable by a human, as in a head-mounted display (HMD).

With regard to the configurations of the human detection system 1 according to the present exemplary embodiment, a plurality of devices, such as the human detection device 20 and the storage device 30, may be integrated into a unit to constitute a human detection device provided with a storage unit. In addition, all the configurations of the human detection system 1 may be integrated into a unit to constitute a human detection device provided with a front-view imaging unit, a storage unit, and a display unit. Of course, the human detection system 1 may be configured as a distance calculating system, a human tracking system, or a collision prevention system, or furthermore, as a distance calculating method or a distance calculating program.

As described above, a human detection device 20 according to the present exemplary embodiment comprises an image acquiring unit 21 configured to acquire an image captured by an imaging device 10, a human detecting unit 22 configured to detect a human from the acquired image, a ground contact position identifying unit 23 configured to identify a ground contact position of the human on the basis of a lower end portion of the detected human, a feature portion extracting unit 24 configured to extract a feature portion of the detected human, a ratio calculating unit 25 configured to calculate a ratio of the feature portion on the basis of a vertical size of the detected human and a vertical size of the extracted feature portion and a correction determining unit 26 configured to determine whether the identified ground contact position is to be corrected on the basis of the identified ground contact position or the calculated ratio, in which the ground contact position identifying unit 23 corrects the identified ground contact position on the basis of the vertical size and the ratio of the feature portion.

Such a configuration makes it possible to correct the incorrectly identified ground contact position of a pedestrian or the like.

Additionally, in the human detection device 20 according to the present exemplary embodiment, the correction determining unit 26 can determine that the identified ground contact position is to be corrected when the ratio of the feature portion indicates an abnormal value.

Such a configuration makes it possible to determine whether a correction is to be made on the basis of a feature of a detected human.

Moreover, in the human detection device 20 according to the present exemplary embodiment, the correction determining unit 26 can determine that the identified ground contact position is to be corrected when an irregular variation is observed in the identified ground contact position or in the calculated ratio among a plurality of images acquired by the image acquiring unit 21.

Such a configuration makes it possible to determine whether a correction is to be made on the basis of history information.

Moreover, in the human detection device 20 according to the present exemplary embodiment, the correction determining unit 26 can determine that the identified ground contact position is to be corrected when no irregular variation is observed in a position of the extracted feature portion among a plurality of images.

Such a configuration makes it possible to determine more correctly whether a correction is to be made.

Moreover, the human detection device 20 according to the present exemplary embodiment can determine that the human is to be detected anew when the identified ground contact position varies up and down repeatedly or the calculated ratio varies to increase and decrease repeatedly among a plurality of images acquired by the image acquiring unit 21.

Such a configuration makes it possible to distinguish a pedestrian from a bicyclist or the like.

Moreover, in the human detection device 20 according to the present exemplary embodiment, the feature portion extracting unit 24 can extract a head portion of the detected human as the feature portion.

Such a configuration allows a head portion that can be extracted with ease and that moves less while a human walks to serve as a feature portion.

Moreover, a human detection system 1 according to the present exemplary embodiment can comprise the human detection device 20 and at least one of the imaging device 10 or a display device 40 configured to display the image.

Moreover, a human detection method according to the present exemplary embodiment comprises Step S10 of acquiring an image captured by an imaging device, Step S20 of detecting a human from the acquired image, Step S30 of identifying a ground contact position of the human on the basis of a lower end portion of the detected human, Step S40 of extracting a feature portion of the detected human, Step S50 of calculating a ratio of the feature portion on the basis of a vertical size of the detected human and a vertical size of the extracted feature portion, Step S60 of determining whether the identified ground contact position is to be corrected on the basis of the identified ground contact position or the calculated ratio and Step S70 of correcting the identified ground contact position on the basis of the vertical size and the ratio of the feature portion.

Moreover, a human detection program according to the present exemplary embodiment that causes a computer to execute Procedure S10 of acquiring an image captured by an imaging device, Procedure S20 of detecting a human from the acquired image, Procedure S30 of identifying a ground contact position of the human on the basis of a lower end portion of the detected human, Procedure S40 of extracting a feature portion of the detected human, Procedure S50 of calculating a ratio of the feature portion on the basis of a vertical size of the detected human and a vertical size of the extracted feature portion, Procedure S60 of determining whether the identified ground contact position is to be corrected on the basis of the identified ground contact position or the calculated ratio and Procedure S70 of correcting the identified ground contact position on the basis of the vertical size and the ratio of the feature portion.

The human detection system according to the exemplary embodiment corrects an identified ground contact position on the basis of the vertical size and the ratio of a feature portion of a detected human and thus has industrial applicability.

What is claimed is:

1. A human detection device, comprising a processor configured to function as:
   an image acquiring unit configured to acquire an image captured by an imaging device;
   a human detecting unit configured to detect a human from the acquired image;
   a ground contact position identifying unit configured to identify a ground contact position of the human on the basis of a lower end portion of the detected human;
   a feature portion extracting unit configured to extract a feature portion of the detected human;
   a ratio calculating unit configured to calculate a ratio of the feature portion on the basis of a vertical size of the detected human and a vertical size of the extracted feature portion; and
   a correction determining unit configured to determine whether the identified ground contact position is to be corrected on the basis of the identified ground contact position or the calculated ratio,
   wherein the ground contact position identifying unit corrects the identified ground contact position on the basis of the vertical size and the ratio of the feature portion.

2. The human detection device according to claim 1, wherein the correction determining unit determines that the identified ground contact position is to be corrected when the ratio of the feature portion indicates an abnormal value.

3. The human detection device according to claim 1, wherein the correction determining unit determines that the identified ground contact position is to be corrected when an irregular variation is observed in the identified ground contact position or in the calculated ratio among a plurality of images acquired by the image acquiring unit.

4. The human detection device according to claim 1, wherein the correction determining unit determines that the identified ground contact position is to be corrected when no irregular variation is observed in a position of the extracted feature portion among a plurality of images acquired by the image acquiring unit.

5. The human detection device according to claim 1, wherein the correction determining unit determines that the human is to be detected anew when the identified ground contact position varies up and down repeatedly or the calculated ratio varies to increase and decrease repeatedly among a plurality of images acquired by the image acquiring unit.

6. The human detection device according to claim 1, wherein the feature portion extracting unit extracts a head portion of the detected human as the feature portion.

7. A human detection system, comprising:
   the human detection device according to claim 1; and
   at least one of the imaging device or a display device configured to display the image.

8. A human detection method, comprising:
   acquiring an image captured by an imaging device;
   detecting a human from the acquired image;
   identifying a ground contact position of the human on the basis of a lower end portion of the detected human;
   extracting a feature portion of the detected human;
   calculating a ratio of the feature portion on the basis of a vertical size of the detected human and a vertical size of the extracted feature portion;
   determining whether the identified ground contact position is to be corrected on the basis of the identified ground contact position or the calculated ratio; and
   correcting the identified ground contact position on the basis of the vertical size and the ratio of the feature portion.

9. A human detection program stored on a non-transitory computer readable medium that causes a computer to execute:
   acquiring an image captured by an imaging device;
   detecting a human from the acquired image;
   identifying a ground contact position of the human on the basis of a lower end portion of the detected human;
   extracting a feature portion of the detected human;
   calculating a ratio of the feature portion on the basis of a vertical size of the detected human and a vertical size of the extracted feature portion;
   determining whether the identified ground contact position is to be corrected on the basis of the identified ground contact position or the calculated ratio; and
   correcting the identified ground contact position on the basis of the vertical size and the ratio of the feature portion.

* * * * *